July 3, 1928. 1,676,087
L. HERBORN
BRAKE FOR HOISTING DEVICES AND THE LIKE
Filed Nov. 7, 1927 4 Sheets-Sheet 1

Inventor:
Ludwig Herborn
ATTY

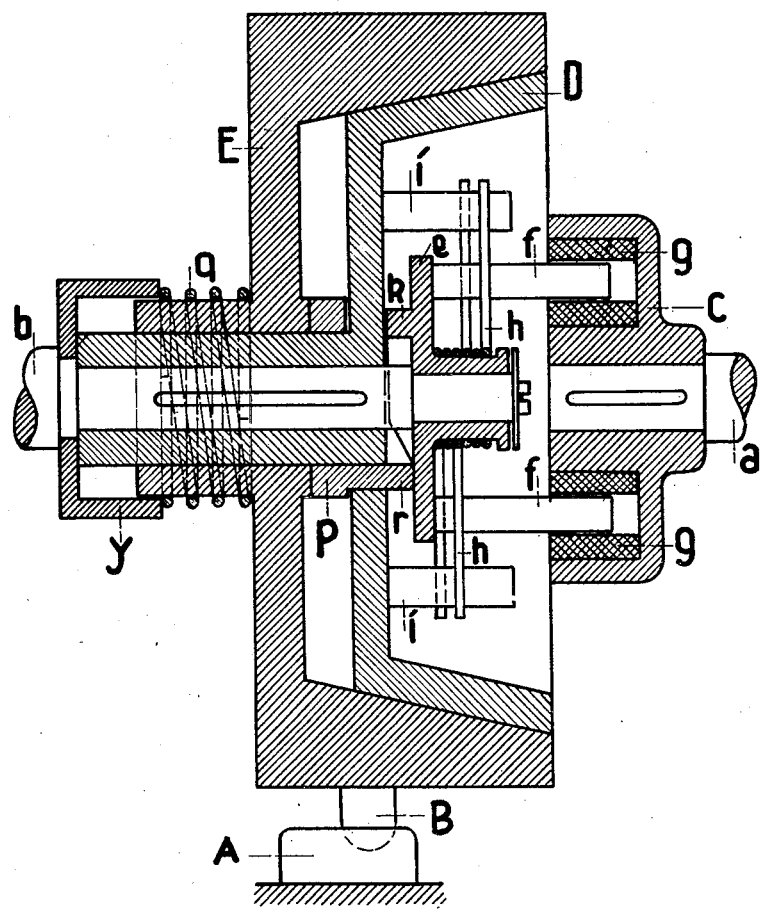

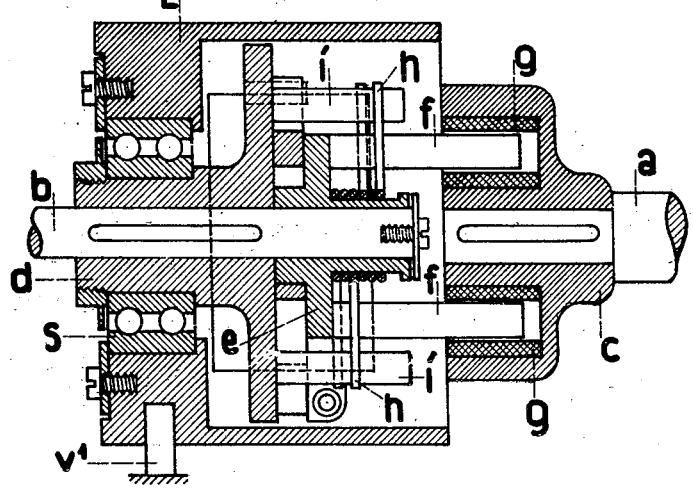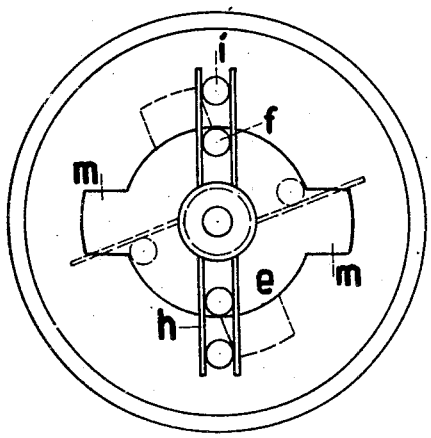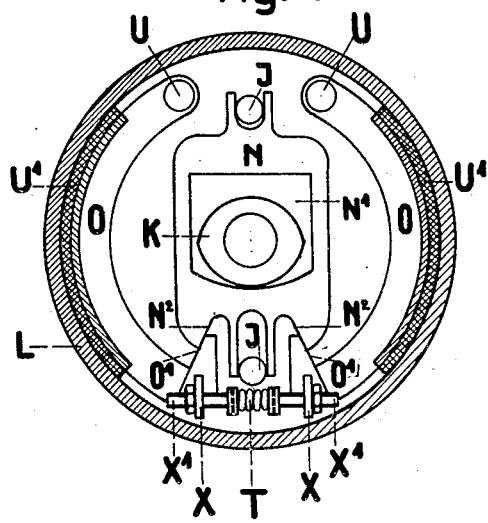

July 3, 1928.  
L. HERBORN  
BRAKE FOR HOISTING DEVICES AND THE LIKE  
Filed Nov. 7, 1927  
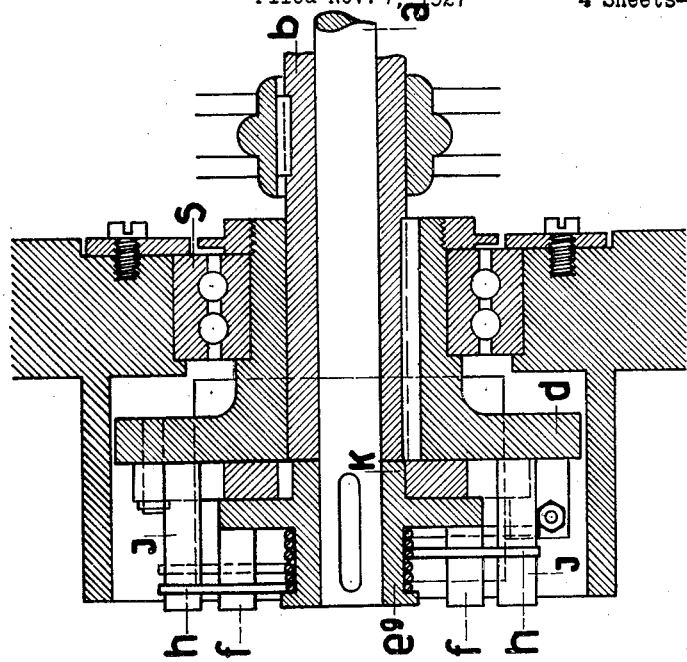
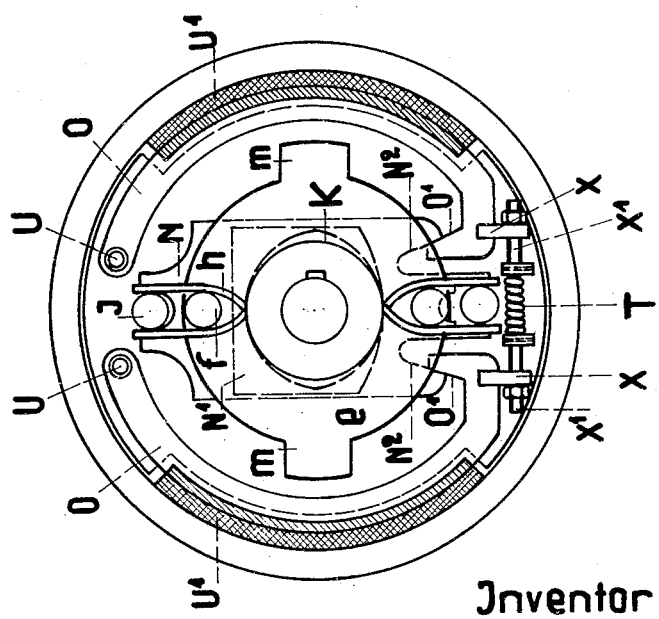
Inventor:  
Ludwig Herborn Patented July 3, 1928.

1,676,087

UNITED STATES PATENT OFFICE.

LUDWIG HERBORN, OF BIERSTADT, GERMANY, ASSIGNOR OF ONE-THIRD TO WILLY HORN AND ONE-THIRD TO AUGUST HORN, BOTH OF WIESBADEN, GERMANY.

BRAKE FOR HOISTING DEVICES AND THE LIKE.

Application filed November 7, 1927, Serial No. 231,756, and in Germany February 2, 1925.

My invention relates to an automatically acting brake combined with a coupling, and more especially designed for power-driven hoisting devices and the like and hauling machines. My invention is based on an improved coupling, connected in such a manner with an automatic mechanical brake, that the brake is thrown off before the driving shaft carries along the driven shaft by means of the coupling and is again thrown on automatically when the driving shaft is stopped. The invention consists in interposing a dead play between the two shafts to be coupled, during which dead play the brake is thrown off, and the coupling-halves being connected together by springs in such a manner that when the driving shaft is stopped they return automatically to their original position, whereby the brake is applied. The braking pressure is supplied in the well-known manner by a weight or by spring power. For hoisting devices running in both directions dead play is interposed for each rotating direction. The member throwing off the brake is hereby acted on by two springs which are each subjected to tension during the dead play when the machine is running in a given direction. The springs may also be so dimensioned that they already throw on the brake when the speed at which the driving shaft revolves falls below a certain given amount. As brake, any of the well-known constructions may be used, as, for instance, such with radially movable cheeks or axially movable brake-disks.

Embodiments of my invention are shown in the drawings, by way of examples.

Fig. 5 is another embodiment of the invention in axial section.

Figs. 6 to 8 show another embodiment of the invention, to-wit:

Fig. 6 in axial section, Fig. 7 an overhead view of the driven coupling member and Fig. 8 the embodiment in a section, perpendicular to the axis. Figs. 9 and 10 illustrate a modification in a side view and cross-section, respectively.

Figure 1:
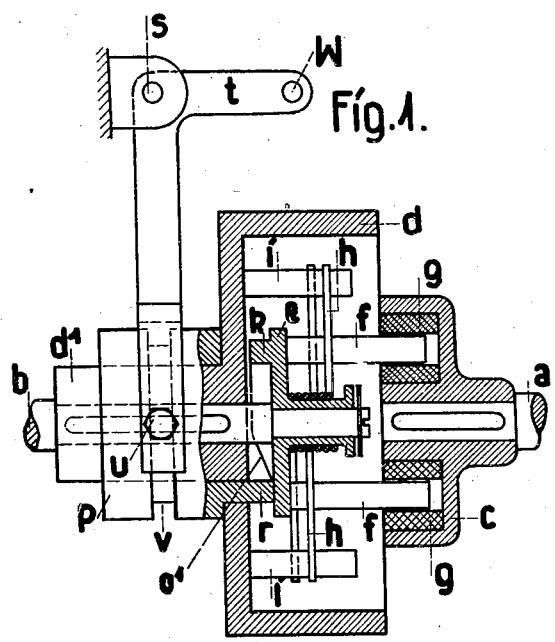
Fig. 1 shows one embodiment, partially in axial section and partially in side elevation.
Figure 2:
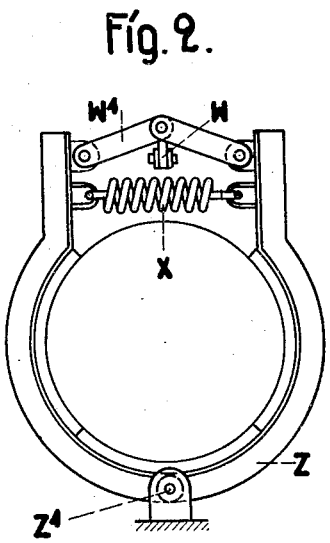
Fig. 2 is a plan or overhead outline of the brake in connection with the coupling.
Figure 3:
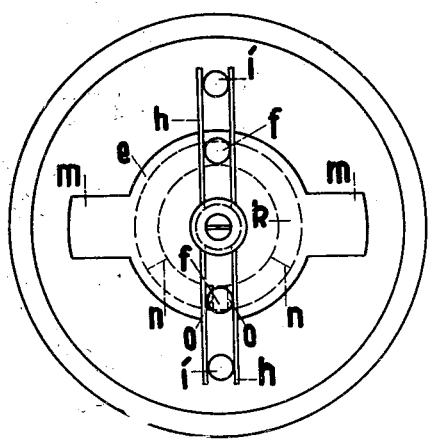
Fig. 3 is an overhead view of the coupling member carried by the driven shaft, the driving shaft being assumed to be standing still.

In the drawings $a$ designates the driving shaft, $b$ the driven shaft, $c$ and $d$ the coupling-halves carried by these shafts. In all embodiments a disk $e$ is rotatably mounted on the end of the driven shaft $b$, said disk $e$ interlocking by means of studs $f$ in recesses $g$ of the driving member $c$. The recesses $g$ are lined with leather or rubber or some other yielding material. The disk $e$ is provided on its hub with two springs $h$ which with their extending ends rest against studs $i$ carried by the driven coupling member $d$, from opposite directions. In the embodiment shown in Figs. 1 to 4 the disk $e$ is provided, on the side facing the driven coupling member $d$, with an annular appendage $k$, the front surface of which, between the radial edges $o$ and $n$, is sloped wedge-shaped (as at $o^1$ in Figure 1). A sleeve $p$ is slidably mounted on the hub $d^1$ of the driven coupling member $d$. The sleeve $p$ is fitted with a stud $r$ which passes through the wall of the coupling member $d$, said wall being perpendicular to the axis, whereby said stud $r$ rests against the sloping surfaces of the annular appendage $k$. An independently mounted bent lever $t$, swinging on a peg $s$ on the machine, embraces, with the one end, which is desirably bifurcated, the sleeve $p$ which it engages by means of a radial bolt $u$, which is guided loosely in an annular groove $v$ on the sleeve $p$. The other end of the bent lever $t$ is hinged by a bolt $w$ to a toggle-jointed lever $w^1$. The toggle-pointed lever $w^1$ is hinged with both ends to the brake cheeks $z$, pivotally mounted at $z^1$ (Fig. 2). The latter shown separately, in order not to render Figure 1 obscure.

My new device operates as follows:

When the driving shaft $a$ begins to rotate while the coupling member $d$ is stationary, disk $e$ is carried along by the studs $f$ until the stops $m$, arranged on disk $e$, interlock with studs $i$ of the coupling member

Figure 4:
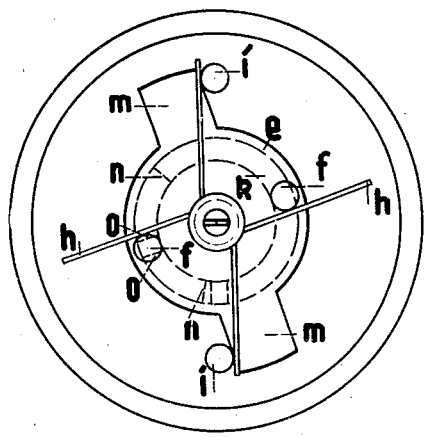
Fig. 4 is an overhead view of the same coupling member after engagement with the driving coupling member.

*d* (Fig. 4). In the relative rotation of the disk *e* with respect to the coupling member *d*, the springs *h* come under tension. The originally parallel ends of the springs *h* assume at the ultimate position of said disk *e* the position shown in Fig. 4. As the disk *e* rotates, the sleeve *p* is axially shifted on the hub $d^1$, as a result of the joint action of the wedge-shaped inclinations between *o* to *n* of the annular appendage *k* and the stud *r* which the sleeve *p* carries, so that the bent lever *t* interlocking with bolt *u* into the annular groove *v*, is swung clockwise. Hereby the toggle-jointed lever $w^1$ is expanded and the brake-cheeks *z* are pressed apart against the action of the spring *x* so that they recede from the coupling member *d* which is simultaneously built as a brake-drum, thereby releasing it. As soon as the driving force ceases to act upon shaft *a* the disk *e*, under the action of the tensioned springs *h*, returns to its original position. Simultaneously the spring *x* causes the brake-cheeks *z* to press against the coupling member *d* and the bent lever *t* with the sleeve *p* to return to their original position.

In the embodiment shown in Fig. 5 the parts designated with letters *a* to *k* and *r* correspond to the parts with similar designations in Figs 1 to 4. The radial rotary motion of disk *e* with respect to the coupling member D is converted, in a similar manner as in the embodiment shown in Figs. 1 to 4, by means of a wedge-shaped slope $o^1$, into an axial shifting of a ring P. The ring P rests loosely on an axially shiftable brake-disk E which works together by means of a hollow conical interior surface with the corresponding conical exterior surface of the driven coupling-half D. The brake-disk E is acted upon by a spring *q* which rests with its one end against a member *y* carried by shaft *b* and with its other end against the brake-disk E, and which is prevented from turning by a stud B and a rigid stop A. When the driving shaft *a* is set in rotary motion, the disk E as well at first rotates with respect to the coupling member D until it engages the latter in a well-known manner by means of stops (similar to the stops *m* in Figs. 1 to 4) which, however, are not especially shown in Fig. 5. As the disk E rotates, the stud *r*, and with it the ring P, is shifted axially to the left by joint action with the inclined surface of the annular appendage *k*, whereby the ring P carries along the brake-disk E against the action of the spring *q*, thereby throwing off the brake. After the shaft *a* has been stopped, the springs *h* cause the disk E to return to its original position in the center so that the inclined surfaces of the annular appendage *k* release the stud *r* and the brake-disk E is shifted to the right by the spring *q* until it interlocks with the coupling member D.

In the embodiments shown in Figs. 1 to 5 the dead play interposed between the driving and the driven shaft is utilized for shifting axially an intermediate member which throws off the brake.

Figs. 6 to 8 show an embodiment of the invention in which a radial movement derived from the driving shaft during the dead play, of a controlling member, is utilized to open and close the brake. In this embodiment the parts *a* to *i* and *m* coincide with the parts of similar designation in Figs. 1 to 5. The hub of the coupling member *d* is journalled in a ball-bearing S of a brake-drum L, secured against turning by a stud $v^1$. The disk *e* is provided with an eccentric disk K which engages a slot $N^1$ of a radially shiftable slide N. The slide N is guided by one of the studs J and by means of inclined surfaces $N^2$, engages the sloping appendages $O^1$ of the brake-cheeks O. The brake-cheeks O swing on the turning pivot U and are provided with a brake-lining $U^1$, with which they rest from within against the brake-drum L. When the driving shaft *a* is stationary the brake-cheeks O are pressed against the brake-drum L by a spring T which rests against the flanges X on the brake-cheeks. As soon as shaft *a* begins to rotate, a rotation of disk *e* with respect to shaft *b* takes place, during which the springs *h* are subjected to tension and the slide N is shifted downward in a radial direction by means of the eccentric disk K so that by the working together of the inclined surfaces $N^2$ with the appendages $O^1$ the brake-cheeks O are disengaged from the brake-drum L. On stopping the shaft *a* the disk *e* returns under the influence of the action of springs *h* to its original position, whereby the slide N is shifted upward by means of the eccentric K in a radial direction, and the spring T presses the brake-cheeks O apart until the brake-drum L is engaged.

In the embodiments shown in Figures 1 to 8 inclusive, the driving shaft and the driven shaft are opposing each other. The embodiment shown in Figures 9 and 10, in side view and longitudinal section respectively, presumes that both shafts are arranged one within the other. In these figures those parts which also occur in Figures 6 to 8, bear like designation letters. With this modified construction, however, the disk $e^9$ is fixed upon the driving shaft *a* as indicated in Figures 9 and 10. In consequence of this feature the coupling member *c* and slots *g* could be omitted.

The operation of this modified construction is the same as described above with reference to Figures 6 to 8.

I am quite aware of the fact that other modifications may be made, without leaving the scope of my invention.

What I claim as my invention and desire to secure by Letters Patent of the United States is:—

1. A braking device of the character described, comprising, in combination, a brake, a device for rendering said brake operative and inoperative, a driving shaft, a driven shaft, a coupling member on said driving shaft, a coupling member on said driven shaft, a second coupling member on said driven shaft and adapted to coact with said first coupling member, said both coupling members engaging each other in such a manner that thereby a dead play is inserted in either direction between said shafts carrying said respective coupling members, and means operatively connected to said brake operating device and said coupling members in such a manner as to become operative during said dead play of said shafts.

2. A braking device of the character described, comprising, in combination, a brake, a device for rendering said brake operative and inoperative, a driving shaft, a driven shaft, a coupling member on said driving shaft, a coupling member on said driven shaft, a second coupling member on said driven shaft and adapted to coact with said first coupling member, said both coupling members engaging each other in such a manner that thereby a dead play is inserted in either direction between said shafts carrying said respective coupling members, means operatively connected to said brake operating device and said coupling members in such a manner as to become operative during said dead play of said shafts, and in connection with said last named means additional means adapted to become tensioned during said dead play movement of said shafts so as to be able to return automatically said last means into its initial position.

3. A braking device of the character described, comprising, in combination, a brake, a device for rendering said brake operative and inoperative, a driving shaft, a driven shaft, a coupling member on said driving shaft, a coupling member on said driven shaft, a second coupling member on said driven shaft and adapted to coact with said first named coupling member, said both coupling members engaging each other in such a manner that thereby a dead play is inserted in either direction between said shafts carrying said respective coupling members, a member positively connected to one of said coupling members and adapted to perform an independent movement during said dead play of said shafts, and means operatively connected to said brake operating device and said last named member whereby said brake is rendered inoperative in consequence of said dead play of said shafts.

4. A braking device of the character described, comprising, in combination, a brake, a device for rendering said brake operative and inoperative, a driving shaft, a driven shaft, a coupling member on said driving shaft, a coupling member on said driven shaft, a second coupling member on said driven shaft and adapted to coact with said first named coupling member, said both coupling members engaging each other in such a manner that thereby a dead play is inserted in either direction between said shafts carrying said respective coupling members, a member positively connected to one of said coupling members and adapted to perform an independent movement during said dead play of said shafts, means operatively connected to said brake operating device and said last named member, whereby said brake is rendered inoperative in consequence of said dead play of said shafts, and resilient means in connection with said last named member and so arranged as to become tensioned during said independent movement of said last named member, whereby said last named member is being automatically returned to its initial position when the driving power ceases to act on said driving shaft.

LUDWIG HERBORN.